(12) United States Patent
Sumiyoshi et al.

(10) Patent No.: US 8,552,965 B2
(45) Date of Patent: Oct. 8, 2013

(54) DISPLAY DEVICE AND ELECTRONIC APPLIANCE

(75) Inventors: Ken Sumiyoshi, Kawasaki (JP); Koji Mimura, Kawasaki (JP); Yuji Kondo, Kawasaki (JP); Masatake Baba, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 943 days.

(21) Appl. No.: 12/260,633

(22) Filed: Oct. 29, 2008

(65) Prior Publication Data

US 2009/0109169 A1 Apr. 30, 2009

(30) Foreign Application Priority Data

Oct. 30, 2007 (JP) .................................. 2007-282459
Sep. 25, 2008 (JP) .................................. 2008-246065

(51) Int. Cl.
*G09G 3/36* (2006.01)
(52) U.S. Cl.
USPC ........................................................ 345/102
(58) Field of Classification Search
USPC ........................................................ 345/102
See application file for complete search history.

(56) References Cited

U.S. PATENT DOCUMENTS

| 5,956,107 | A * | 9/1999 | Hashimoto et al. ............... 349/64 |
| 7,223,005 | B2 * | 5/2007 | Lamb et al. ..................... 362/615 |
| 7,303,322 | B2 * | 12/2007 | Lamb et al. ..................... 362/600 |
| 7,855,756 | B2 * | 12/2010 | Hong et al. ....................... 349/15 |
| 2002/0054033 | A1 * | 5/2002 | Nakamura et al. ............... 345/204 |
| 2002/0067447 | A1 * | 6/2002 | Sasagawa et al. ................ 349/113 |
| 2004/0223100 | A1 * | 11/2004 | Kotchick et al. ................. 349/114 |
| 2006/0007102 | A1 * | 1/2006 | Yasuoka et al. .................. 345/102 |
| 2006/0066541 | A1 * | 3/2006 | Gally et al. ........................ 345/84 |
| 2006/0066641 | A1 * | 3/2006 | Gally et al. ...................... 345/690 |
| 2006/0092668 | A1 * | 5/2006 | Sugiura et al. ................... 362/616 |
| 2006/0209567 | A1 * | 9/2006 | Sakurai et al. ................... 362/626 |
| 2007/0146261 | A1 * | 6/2007 | Matsushima et al. .............. 345/87 |
| 2007/0285775 | A1 * | 12/2007 | Lesage et al. .................... 359/465 |
| 2008/0180956 | A1 * | 7/2008 | Gruhlke et al. .................. 362/331 |
| 2010/0194785 | A1 * | 8/2010 | Huitema et al. .................. 345/690 |

FOREIGN PATENT DOCUMENTS

| CN | 1702512 A | 11/2005 |
| CN | 1721941 A | 1/2006 |
| JP | 60-140322 A | 7/1985 |
| JP | 09-197405 A | 7/1997 |
| JP | 10-319384 A | 12/1998 |
| JP | 2005-114762 A | 4/2005 |

(Continued)

OTHER PUBLICATIONS

Japanese Office Action issued Jan. 8, 2013 in corresponding Japanese Patent Application No. 2008-246065.

*Primary Examiner* — Amare Mengistu
*Assistant Examiner* — Sarvesh J Nadkarni
(74) *Attorney, Agent, or Firm* — Sughrue Mion, PLLC

(57) ABSTRACT

To provide a liquid crystal display device capable of switching the range of viewing angles while being able to reduce the cost and thickness of the device, and to provide an electronic appliance having the same. The display device according to the present invention includes: a liquid crystal type display panel having a diffusive reflection part which diffusively reflects light irradiated from the front side while transmitting light from the back side; and a backlight source disposed on a back face of the display panel along the display panel for switchably outputting transmission light of different directivities.

9 Claims, 10 Drawing Sheets

(56) References Cited

FOREIGN PATENT DOCUMENTS

| JP | 2005-265920 A | 9/2005 |
|----|---------------|--------|
| JP | 2006-140126 A | 6/2006 |
| JP | 2007-033813 A | 2/2007 |
| JP | 2007-079093 A | 3/2007 |
| JP | 2007-171522 A | 7/2007 |
| JP | 2007-171674 A | 7/2007 |
| JP | 2007-206660 A | 8/2007 |
| JP | 2008-300206 A | 12/2008 |

* cited by examiner

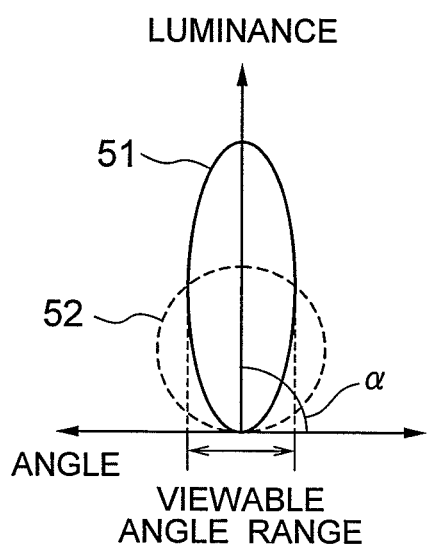 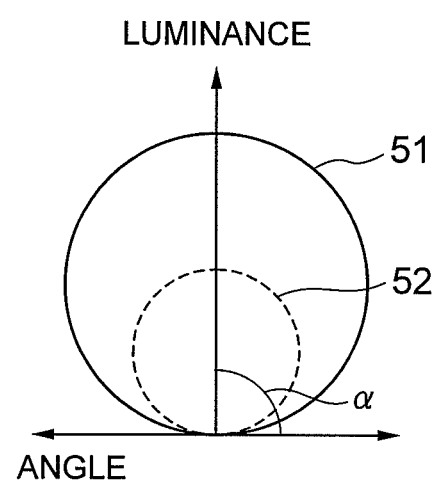
FIG. 2A ⟨NARROW VIEW FIELD MODE⟩
FIG. 2B ⟨WIDE VIEW FIELD MODE⟩

⟨NARROW VIEW FIELD MODE⟩

⟨WIDE VIEW FIELD MODE⟩

DISPLAY DEVICE AND ELECTRONIC APPLIANCE

CROSS-REFERENCE TO RELATED APPLICATIONS

This application is based upon and claims the benefit of priority from Japanese patent application No. 2007-282459, filed on Oct. 30, 2007, and Japanese patent application No. 2008-246065, filed on Sep. 25, 2008, the disclosure of which is incorporated herein in its entirety by reference.

BACKGROUND OF THE INVENTION

1. Field of the Invention

The present invention relates to a display device and an electronic appliance and, more specifically, to a display device and an electronic appliance capable of switching a range of viewing angles.

2. Description of the Related Art

Liquid crystal display devices (LCDs) as non-self luminous display devices have been widely used as display devices of various kinds of electronic appliances such as personal computers (PCs), portable telephone, television receiver sets, digital cameras, etc. When used for a television set in particular, it is sometimes desired to be capable of being viewed in a wide range of angles by decreasing changes in brightness and tones (to be of wide viewing angle). Because of such demands, liquid crystal display devices with a wide viewing angle that is achieved by employing IPS mode or VA mode have recently been put into practical use.

In the meantime, when using the liquid crystal display device for a personal computer or a portable telephone, for example, there is a case where a user wants to share a same display screen with others or a case where the user does not desire for others to look at the screen, depending on the time and circumstances. In that case, there may be required for the same liquid crystal display device to be able to switch the extent of viewing angles (viewing angle ranges) according to the conditions.

Techniques for switching the range of viewing angles of the liquid crystal display device are disclosed in following Patent Documents. Among those, Japanese Unexamined Patent Publication 10-319384 (Patent Document 1) discloses a technique which switches the extent of the viewing angles through adjusting the state of light that makes incident on a liquid crystal panel by utilizing a scattering-type liquid crystal layer that is capable of selecting a scattering state and a transparent state.

More specifically, first, FIG. 9 is a conceptual diagram for describing details of a structure of a conventional liquid crystal display device 500 disclosed in Patent Document 1. In the liquid crystal display device 500, emission light emitted from a surface light source (configured with a lamp tube 503, a light guide plate 504, and a light reflection film 505), which is collimated by a light-shielding unit 506 and becomes highly directive, makes incident on a scattering-type liquid crystal layer 502. The scattering-type liquid crystal layer 502 functions by application of a voltage, and either a scattering state or a transparent state is selected and set.

When the scattering-type liquid crystal layer is set to the scattering state, the highly directive incident light looses the directivity, and turns to diffused light and makes incident on a liquid crystal panel 501. Therefore, transmission display images of the liquid crystal display panel can be observed in a wide viewing angle range. In the meantime, when the scattering-type liquid crystal layer is selected to be in the transparent state, the light from the surface light source makes incident on the liquid crystal display panel 501 by keeping the high directivity. Therefore, transmitted display images on the liquid crystal display panel 501 can be viewed only within a narrow range of viewing angles. By utilizing this, the viewing angle of the liquid crystal display panel 501 can be switched through changing the voltage to be applied to the scattering-type liquid crystal layer 502.

Japanese Unexamined Patent Publication 2007-171674 (Patent Document 2) discloses a transflective liquid crystal display device capable of switching the viewing angles, as a structure in which a reflection part and a transmission part are provided alternately for each pixel of a liquid crystal element. Further, Japanese Unexamined Patent Publication 2006-140126 (Patent Documents 3) and Japanese Unexamined Patent Publication 2007-033813 (Patent Documents 4) disclose techniques which switch the extent of viewing angles by using a transparent/scattering switching element as an element that corresponds to the scattering-type liquid crystal layer 502 shown in FIG. 9.

However, there are following issues with the structure that switches the extent of the viewing angles in the liquid crystal display device 500 according to Patent Document 1 described above. In order to expand the adjustable range of the viewing angles in a narrow range in particular with this structure, it is necessary for the emission light collimated by the light-shielding unit 506 to have still higher directivity.

Therefore, it is necessary to set the height (thickness) of the light-shielding unit 506 to be more than a certain height. This is because sufficiently collimated highly directive emission light cannot be obtained, if the height of the light-shielding unit 506 is insufficient. Since it is necessary to secure the height (thickness) of the light-shielding unit 506 to some extent, there is a limit in thinning the thickness of the liquid crystal display device 500. Further, the height (thickness) of the light-shielding unit 506 has been always a problem not only for keeping the device to be thin but also for keeping the weight.

The liquid crystal display device of Patent Document 2 has the structure in which the reflection part and the transmission part are provided alternately within the liquid crystal element. With this structure, it is necessary to supply different video signals to each of the reflection part and the transmission part, in addition to the fact that the liquid crystal panel itself is in a special structure. Thus, it is necessary to have a plurality of driving circuits by corresponding to each of the parts. Therefore, the liquid crystal display device of Patent Document 2 always faces an issue of high cost.

Further, Patent Documents 3 and 4 are related to a constituent (louver) that corresponds to the light-shielding unit 506 in FIG. 9, and both require collimated emission light with still higher directivity. Therefore, the issue regarding reduction in the thickness of the liquid crystal display device 500 described above still remains. This issue regarding reduction in the thickness cannot overcome even if the techniques of Patent Documents 1-4 are combined.

SUMMARY OF THE INVENTION

An exemplary object of the present invention is to provide a display device capable of switching the range of viewing angles while being able to reduce the cost and thickness of the device, and to provide an electronic appliance having the same.

In order to achieve the foregoing exemplary object, a display device according to an exemplary aspect of the invention includes, as its structure, a display panel and a backlight source disposed on a back face of the display panel along the display panel for switchably outputting transmission light of different directivities, wherein a diffusive reflection part is provided on a front-face side of the display panel for diffusively reflecting light irradiated from the front-face side while transmitting light from a back-face side.

BRIEF DESCRIPTION OF THE DRAWINGS

FIGS. 1A to 1C show illustrations of an exemplary embodiment of a case where a display device of the invention is embodied as a liquid crystal display device, in which FIG. 1A is a schematic block diagram showing an example of a display device including a diffusive reflection part having uneven surface provided on a front face of a liquid crystal panel, FIG. 1B is a schematic block diagram showing an example of a display device including another diffusive reflection part that has a diffusive reflection film in a part thereof provided in the front face of the display panel, and FIG. 1C is a schematic block diagram showing an example of a display device including another diffusive reflection part that has a transparent reflection hologram film provided in the front face of the display panel;

FIGS. 2A and 2B show illustrations for describing a relation between luminance distribution of transmission light from a backlight source of the liquid crystal display device disclosed in FIG. 1A and luminance distribution of diffused reflection light that is diffusively reflected by the diffusive reflection part, in which FIG. 2A is an illustration for describing a relation between luminance distributions of the transmission light and the diffusive reflection light in a narrow view field mode, and FIG. 2B is an illustration for describing a relation between luminance distributions of the transmission light and the diffusive reflection light in a wide view field mode;

FIGS. 3A and 3B show illustrations for describing a relation between luminance distribution of transmission light from a backlight source of the liquid crystal display device disclosed in FIG. 1B and luminance distribution of diffused reflection light that is diffusively reflected by the diffusive reflection part, in which FIG. 3A is an illustration for describing a relation between luminance distributions of the transmission light and the diffusive reflection light in a narrow view field mode, and FIG. 3B is an illustration for describing a relation between luminance distributions of the transmission light and the diffusive reflection light in a wide view field mode;

FIGS. 8A and 8B show illustrations of cases where the liquid crystal display device according to the present invention is applied to a display unit of portable terminals, in which FIG. 8A is an explanatory illustration for showing a case where the present invention is employed as a display unit of a portable telephone, and FIG. 8B is an explanatory illustration for showing a case where the present invention is employed as a display unit of a notebook-type personal computer.

DETAILED DESCRIPTION OF THE EXEMPLARY EMBODIMENTS

Hereinafter, an exemplary embodiment of the invention will be described by referring to FIG. 1A to FIG. 4.

First, the basic structure of the exemplary embodiment will be described, and the specific contents thereof will be described in detail thereafter.

(Basic Structure)

This exemplary embodiment will be described by referring to a case of employing a liquid crystal display device as a display device.

Figure 1A:
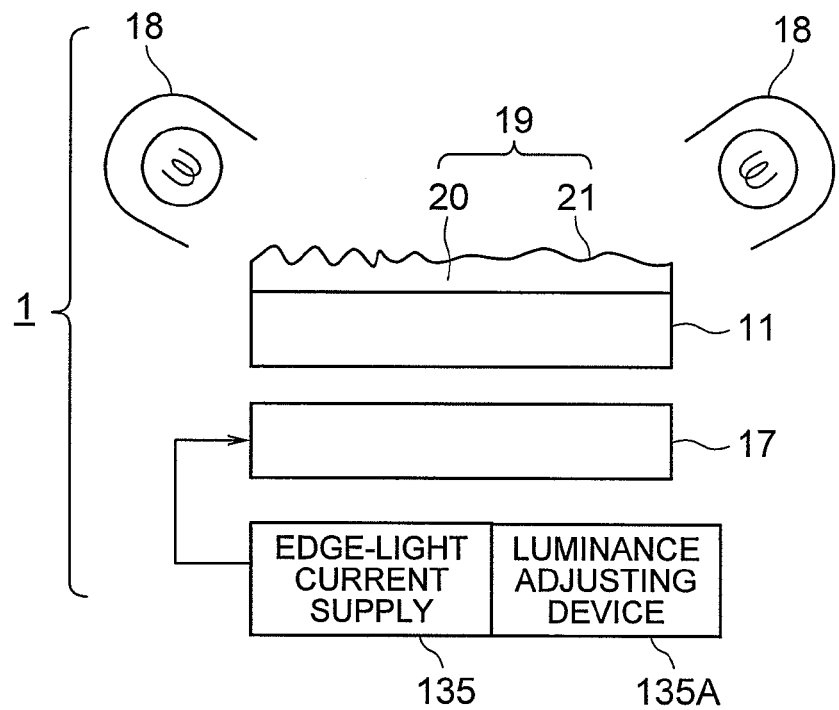

First, referring to FIG. 1A, a liquid crystal display device 1 includes: a liquid-crystal type display panel 11 as a display panel which outputs and displays various kinds of information to the outside; and a backlight source 17 disposed on the back face of the display panel 11 along the display panel 11 for switchably outputting transmission light of different directivities towards the display panel 11. A diffusive reflection part 19 is provided on the front face-side of the display panel 11 (top-face side in FIG. 1A) for diffusively reflecting light irradiated from the front side while transmitting the light from the back-face side.

On the upper side of the display panel 11 in FIG. 1A, front-face side light sources 18 for irradiating light from the above towards the front face of the display panel 11 obliquely are disposed on the front face side of the display panel 11 separately on both sides (left and right sides) in FIG. 1A, while being isolated from the display panel 11 to some extent.

The backlight source 17 is configured including a transparent-diffusion control element 27 which can electrically adjust the directivity of the transmission light as will be described later. Further, the backlight source 17 is configured including a light-flux control device 25 which collimates the transmission light. Furthermore, the backlight source 17 includes a luminance adjusting device 135A which adjusts the luminance of the transmission light in accordance with the adjustment made on the directivity of the transmission light mentioned above.

Further, a front-face side light source luminance adjusting device 134A (not shown) is provided to the front-face side light source 18 for adjusting the luminance of output light of the front-face side light source 18 in accordance with the adjustment made on the directivity of the transmission light of the backlight source 17 described above.

As described, this exemplary embodiment is capable collimating the transmission light by the light-flux control device 25 of the backlight source 17 and capable of selecting the directivity of the collimated light from two or more kinds by electrically switching the state of the transmission-diffusion control element 27. The exemplary embodiment is structured to superimpose transmission light with different directivities from the back and diffusive reflected obtained by diffusively reflecting the light irradiated from the front face by the diffusive reflection part 19 to be outputted and displayed. With this, the viewable range can be adjusted to a narrow angle range of a vertical direction of the display panel 11 in which the luminance of the transmission light exceeds the luminance of the diffusive reflection light. At the same time, the luminance of the transmission light can be adjusted to exceed the luminance of the diffusive reflection light in a wide view field that is a whole recognizable angle range. As described, with this exemplary embodiment, the range of visually recognizable angles of the display panel 11 can be adjusted by superimposing the directivity of the transmission light from the backlight source 17 with the diffusive reflection light obtained by diffusively reflecting the light irradiated to the front face of the display panel, and individually adjusting the luminance of the transmission light and the luminance of the diffusive reflection light.

This will be described in more detail.

As described above, FIG. 1A, FIG. 1B, and FIG. 1C are illustrations for describing the basic principle of this exemplary embodiment.

Referring to FIG. 1A, the liquid crystal display device as the display device 1 includes the liquid crystal-type display panel 11, the backlight source 17, the front-face side light sources 18, and the diffusive reflection part 19. In this exemplary embodiment, a normal display panel having no specific structure is used as the display panel 11. The backlight source 17 is disposed almost in parallel to the display panel 11, which is a surface light source for irradiating transmission light from the back face of the display panel 11.

Reference numeral 135 indicates an edge light power supply for lighting the light source of the backlight source 17, and reference numeral 135A indicates a luminance adjusting device for the backlight source 17 for adjusting the flown current of the edge light power supply 135. This is the same for FIG. 1B as well.

The front-face side light source 18 is a light source for irradiating the front face of the display panel 11. Further, the front-side luminance adjusting device 134A is a circuit for adjusting the luminance of the output light of the front-face side light source 18, and it is provided to the front-face side light source 18 (not shown).

The diffusive reflection part 19 diffusively reflects the light irradiated from the front-face side light source 18, while transmitting the transmission light that is emitted from the backlight source 17 and transmits through the display panel 11. In FIG. 1A, a diffusive reflection film 20 with uneven surface 21 is laminated on the surface of the display panel 11 to form the diffusive reflection part 19.

Figure 1B:
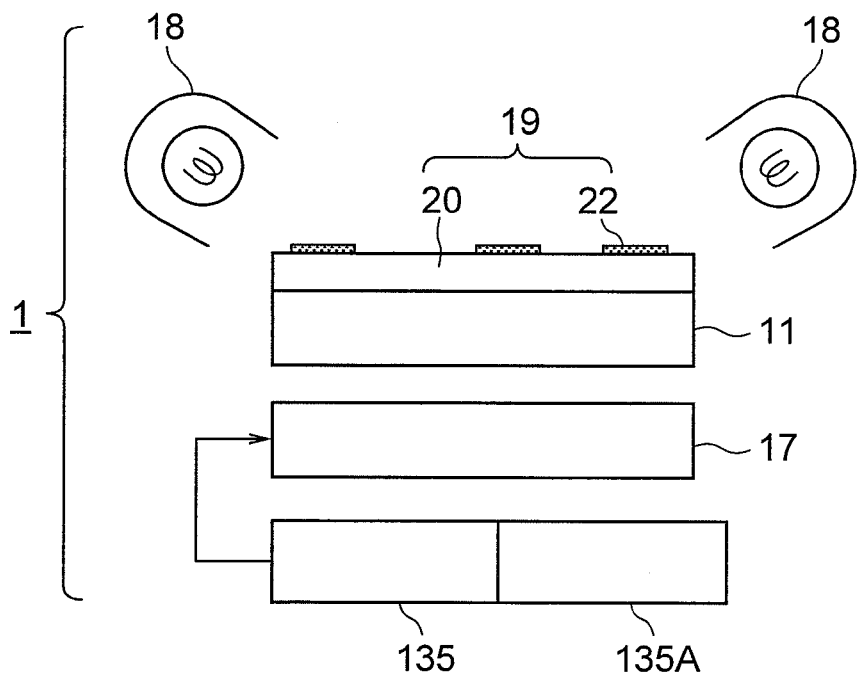

In the meantime, in a case of FIG. 1B, a diffusive reflection film 20 having a diffusive reflection area 22 provided in matrix in a part of the surface thereof is laminated to form the diffusive reflection part 19. In the case of FIG. 1B, structural elements other than the diffusive reflection part 19 are the same as the case of FIG. 1A.

Figure 1C:
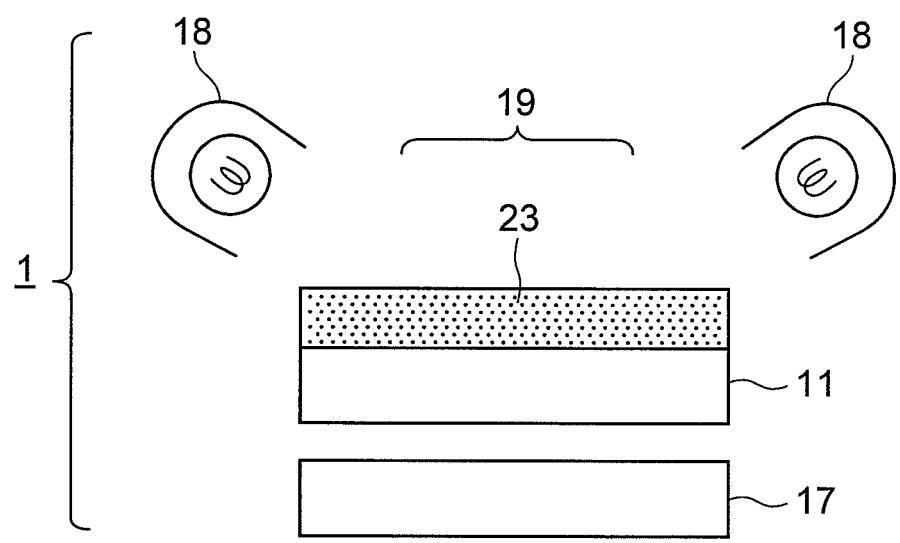

Further, in FIG. 1C, a transparent reflection-type hologram having a refractive index distribution in a thickness direction, which is a film that reflects the light irradiated from an oblique direction to the vertical direction of the display screen (i.e., centering on the perpendicular direction of the screen) is configured as the diffusive reflection part 19.

As described, while there are a plurality of methods for providing the diffusive reflection part 19 to the display panel 11, the diffusive reflection part 19 is provided in the front face of the display panel 11 in this exemplary embodiment. Furthermore, the diffusive reflection part 19 may or may not be physically in contact with the display panel 11.

Figure 6:
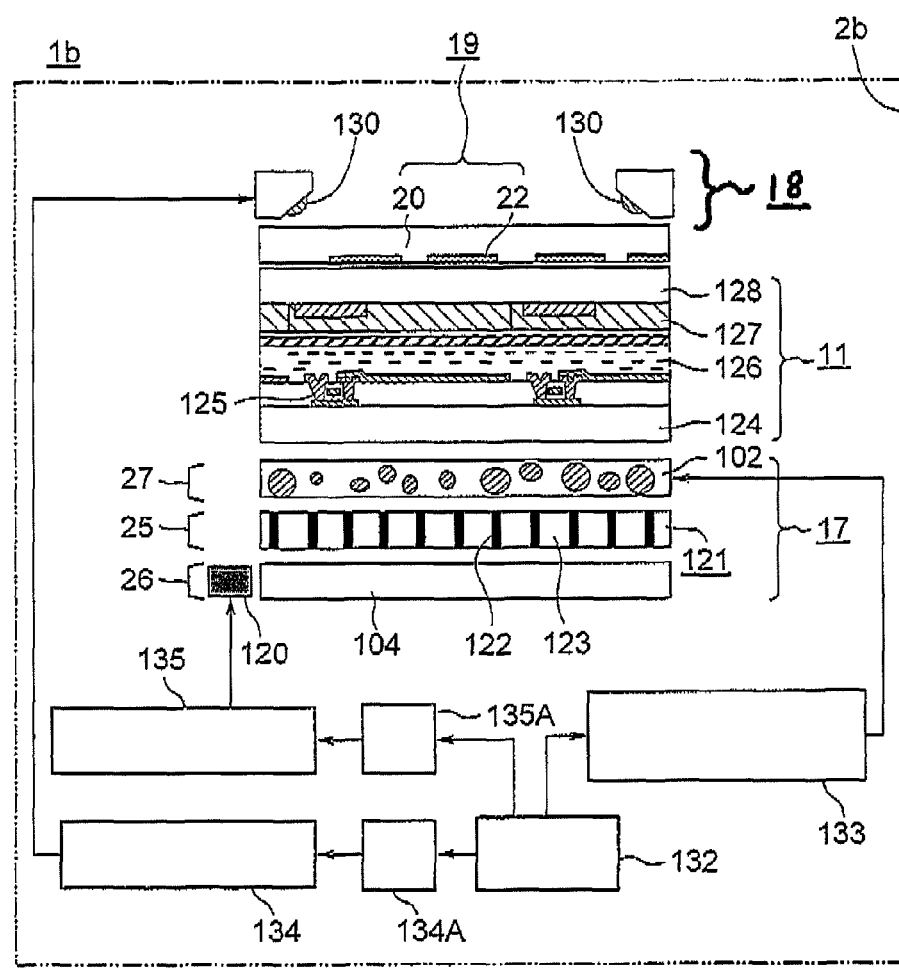
FIG. 6 is a block diagram showing Second Example of the present invention realized based on the exemplary embodiment of the liquid crystal display device disclosed in FIGS. 1A to 1C.

FIG. 2 is a graph showing a luminance distribution of the transmission light from the backlight source 17 disclosed in FIG. 1 and the diffusive reflection light that is obtained when the light irradiated from the front-face side light source 18 is diffusively reflected by the diffusive reflection part 19. Transmission light luminance 51 is illustrated with a solid line, while diffusive reflection light luminance 52 is illustrated with a broken line. Details of intensity adjustment of the transmission light luminance 51 and the diffusive reflection light luminance 52 are shown in FIG. 6 that is described later.

In the narrow view field mode shown in FIG. 2A, the light collimated by an optical member included in the backlight source 17 makes incident as the transmission light. Thus, the intense part of the transmission light luminance 51 comes to be converged within a narrow angle range in the vicinity of the area where an angle α with respect to the display panel 11 becomes an acute angle (90 degrees). In the meantime, the intensity part of the diffusive reflection light luminance 52 is not converged intensely as that of the transmission light luminance 51. However, the peaks of the transmission light luminance 51 and the diffusive reflection light luminance 51 are adjusted to be consistent at a point where the angle with respect to the display panel makes an acute angle. There is an angle at which the luminance value of the transmission light and the luminance value of the diffusive reflection light become consistent, and a range where the luminance of the transmission light exceeds the luminance of the diffusive reflection light is the range of angles observers can visually recognize.

Further, in the wide view field mode shown in FIG. 2B, the transmission light from the backlight source 17 is adjusted to be emitted to a range of wide angles. In FIG. 2B, the diffusive reflection light luminance 52 is the same as that of the narrow view field mode. In this case, the peaks of the transmission light luminance 51 and the diffusive reflection light luminance 52 are also adjusted to be consistent at a point where the angle with respect to the display pane 11 makes an acute angle. Further, the emission luminance of the backlight source 17 is adjusted so that the peak values of the transmission light luminance 51 are almost consistent in the narrow view field mode and the wide view field mode.

In an actual scene, users visually recognize the superimposed light of the transmission light and the diffusive reflection light. Thus, the range of angles (visually recognizable range) where the user can visually recognize the display screen is a range where the transmission light luminance 51 is larger than the diffusive reflection light luminance 52.

In the narrow view field mode shown in FIG. 2A, the range where the transmission light luminance 51 is larger than the diffusive reflection light luminance 52 is limited to a range of narrow angles in the vicinity of the point where the angle with respect to the display panel 11 becomes an acute angle. This limits the visually recognizable range to a narrower angle range than the original transmission light luminance distribution 51. Meanwhile, in the wide view field mode shown in FIG. 2B, the transmission light luminance 51 becomes larger than the diffusive reflection light luminance 52 over a wide range of the front face of the display panel 11, and the transmission light luminance distribution itself becomes the visually recognizable range. Further, the visually recognizable range can be adjusted by adjusting the range where the transmission light luminance 51 becomes larger than the diffusive reflection light luminance 52.

As a way to adjust the visually recognizable range, mention is made of diffusive reflectance of the diffusive reflection part 19. For example, when the diffusive reflection part 19 is provided by forming unevenness on the surface as in FIG. 1A, it is possible to control the diffusive reflectance by adjusting the diffusiveness through adjusting the shapes of the unevenness. When the diffusive reflection part 19 is in a structure where the diffusive reflection area 22 is provided in apart of the surface as in FIG. 1B, the diffusive reflectance can be controlled based on an area ratio of the diffusive reflection area to the areas other than the diffusive reflection area 22. In addition, there are also a method which controls the diffusive reflectance by the size, the refractive index, or the like of the optical member of the diffusive reflection part 19, for example, and a method which controls differences in the refractive indexes of the transparent reflection holograms.

Figure 9:
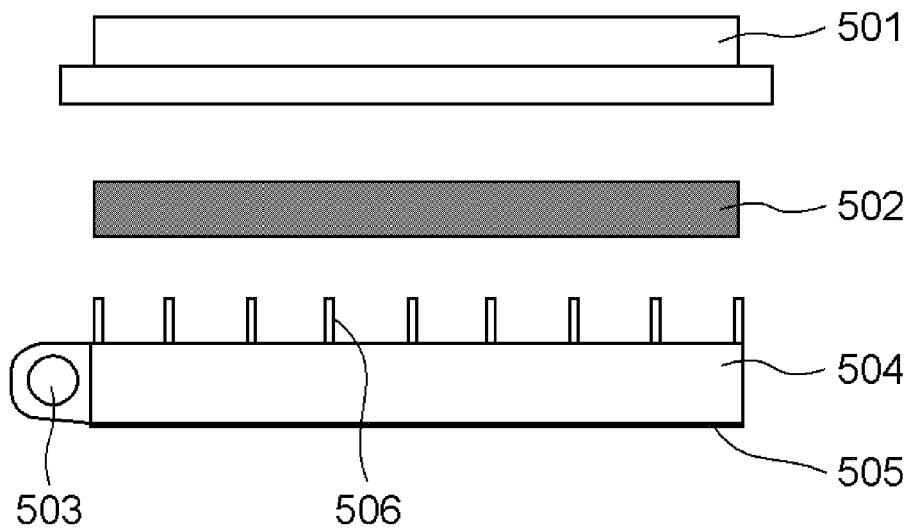
FIG. 9 is a schematic block diagram showing a liquid crystal display device of a related technique that is disclosed in Patent Document 1.

The above-described conventional techniques do not utilize the diffusive reflection light, so that the transmission light is simply collimated to have light of high directivity for obtaining a narrow view field angle. To collimate means to perform optical adjustment so that the light beams come to be in a parallel state. Therefore, as disclosed in FIG. 9, the light-shielding unit for collimating the transmission light requires a thickness (height size) of a certain extent or more, which is an obstacle for thinning the device.

In the meantime, with the exemplary embodiment, the viewable angle range under the narrow view field can be restricted by superimposing the transmission light luminance and the diffusive reflection light luminance that is obtained by diffusively reflecting the light irradiated from the front-side light source by the diffusive reflection part 19. Thus, it is unnecessary to use the optical member capable of obtaining the light of high directivity, so that the device can be formed thin.

Further, the diffusive reflection part 19 is an optical member with a simple structure as disclosed in FIG. 1A, FIG. 1B, and FIG. 1C, so that an increase in the cost caused by providing the diffusive reflection part 19 is insignificant. Note here that the display panel 11 may be a normal display panel having no special structure as described above. Further, the liquid crystal driving circuit (not shown) of the display panel 11 may also be a normal single-system type. Therefore, unlike the conventional cases, there is no large increase in the cost for realizing the exemplary embodiment.

Figure 3A:
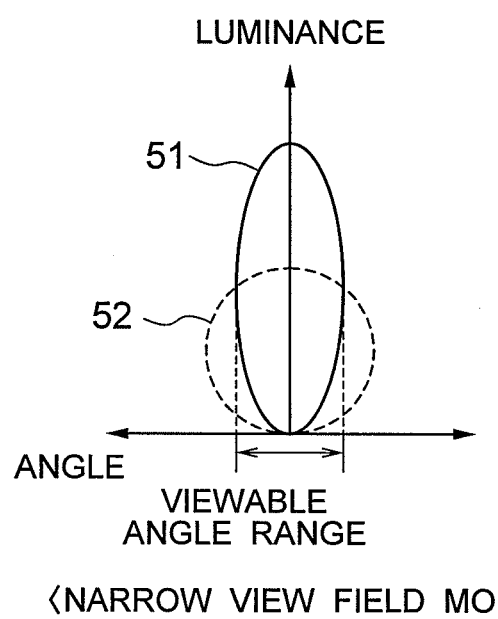
Figure 3B:
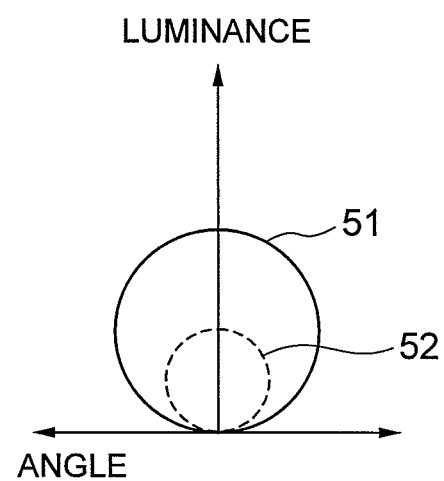

FIG. 3 shows graphs of another example when adjusting the transmission light luminance 51 and the diffusive reflection light luminance 52 shown in FIG. 2. When the mode is shifted from the narrow view field mode shown in FIG. 3A to the wide view field mode shown in FIG. 3B, the distribution forms of the diffusive reflection light luminance 52 are almost the same, and the absolute value of the luminance is decreased. Specifically, that can be achieved by adjusting the luminance of the light irradiated from the front-face side light source 18 to the display panel 11.

By adjusting the luminance of the front-face side light source 18 in addition to adjusting the diffusive reflectance of the diffusive reflection part 19, it is possible to expand the adjustable range of the view field angles. Needless to say, the luminance of the backlight source 17 can also be adjusted as in the case shown in FIG. 2. In any case, adjustment of the extent of the directivity of the transmission light itself is not carried out.

Figure 4:
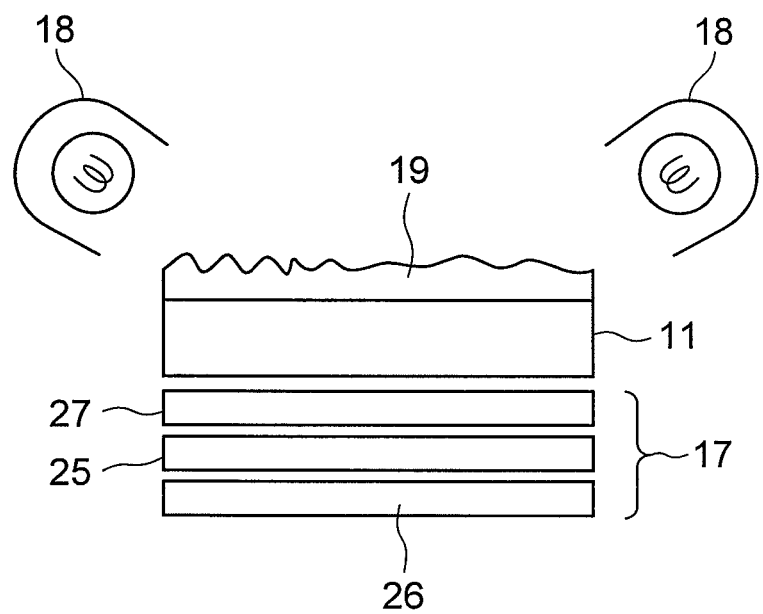
FIG. 4 is an illustration for describing a case where the backlight source part of the liquid crystal display device disclosed in FIG. 1A is illustrated in a more concretive manner.

The liquid crystal display device 1 in FIG. 4 is shown as an overall block diagram which more specifically illustrates the structure of the backlight source 17 that is a part of the liquid crystal display device disclosed in FIG. 1.

In FIG. 4, the backlight source 17 is configured with the surface light source 26, the light-flux control device 25, and the transparent-diffusion control element 27. The light emitted from the surface light source 26 makes incident on the transparent-diffusion control element 27 after being collimated by the light-flux control device 25.

The transparent state and the scattering state of the transparent-diffusion control element 27 are switched by the voltages applied from the outside. When the light collimated by the light-flux control device 25 makes incident on the transparent-diffusion control element 27 in the transparent state, it is emitted while keeping the directivity. The emitted light makes incident on the display panel 11 as the transmission light. Thus, the liquid crystal display device 1 comes to be in a narrow view field state (narrow view field mode) that is disclosed in FIG. 2A.

In the meantime, when the light collimated by the light-flux control device 25 makes incident on the transparent-diffusion control element 27 in the scattering state, it is emitted while being diffused to a range of wide angles, and makes incident on the display panel 11 as the transmission light. Thus, the display device 1 comes to be in a wide view field state (wide view field mode) that is shown in FIG. 2B.

As described above, the narrow view field mode and the wide view field mode can be switched electrically by using the transparent-diffusion control element 27. Further, as described above, the light-flux control device 25 may not have to be a type that can obtain light of high directivity, so that it helps to suppress increase in the thickness.

Next, Examples as more concretive forms of the contents of the above-described exemplary embodiment will be described. Same reference numerals are applied to the same structural elements as those of the above-described exemplary embodiment.

FIRST EXAMPLE

Figure 5:
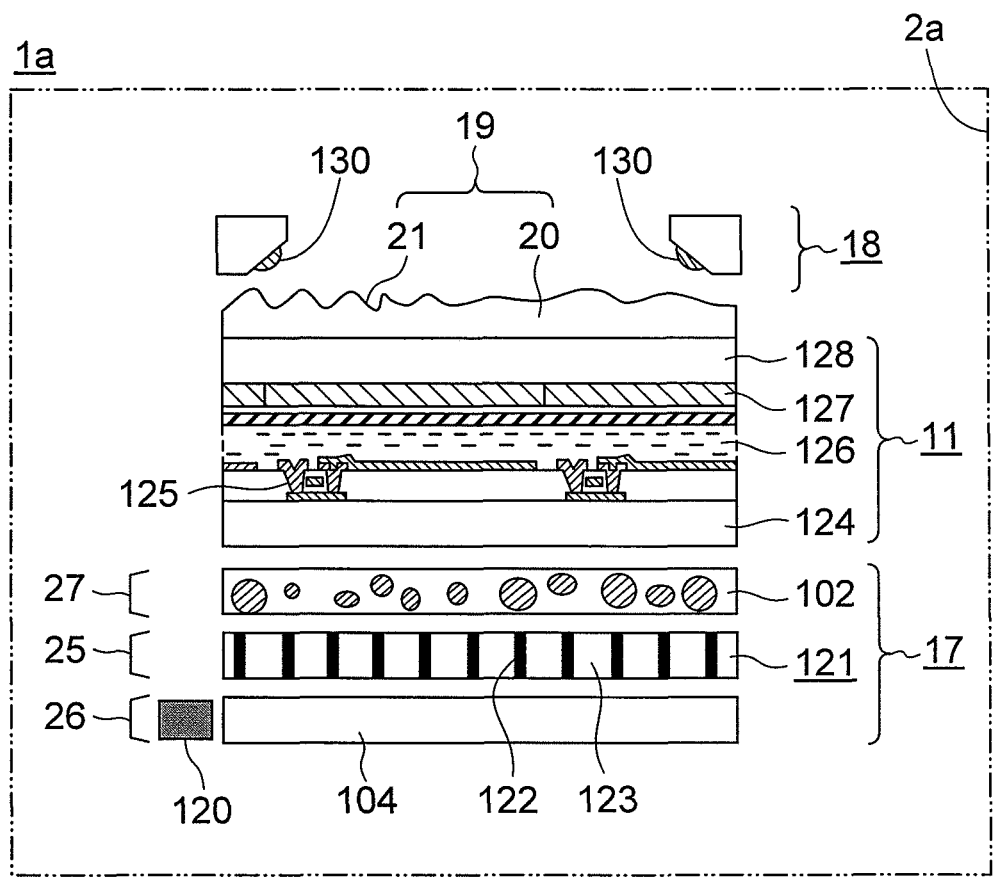
FIG. 5 is a block diagram showing First Example of the present invention realized based on the exemplary embodiment of the liquid crystal display device disclosed in FIGS. 1A to 1C.

FIG. 5 shows First Example.

Each structural element configuring a liquid crystal display device 1a of the First Example shown in FIG. 5 is housed inside a casing 2a whose upper side is optically opened.

Referring to FIG. 5, the display panel 11 as the main structural element in the liquid crystal display device 1a is configured to include a TFT (thin film transistor) substrate 124, a TFT (thin film transistor) 125, a liquid crystal layer 126, a color filter layer 127, a color filter substrate 128, and a diffusive reflection part 19. The diffusive reflection part 19 is configured with a diffusive reflection film 20 whose uneven surface 21 is formed by diffusion beads. The diffusive reflection film 20 has an optical characteristic having 90% total light transmittance and 46% haze value, and has both of the transmission characteristic and diffusion characteristic. Each of the structural elements of the display panel 11 is staked in order and mounted on the TFT (thin film transistor) substrate 124, as shown in FIG. 5.

Among those, the TFT substrate 124 is a substrate for supporting the TFT 125, and the color filter substrate 128 is a substrate for supporting the color filter layer 127.

The display panel 11 achieves color display by changing the polarization state through applying voltage to the liquid crystal layer 126 by the TFT 125, and combining it with the color filter layer 127 that corresponds to pixel colors.

Further, the liquid crystal display device 1a has a backlight source 17 on the bottom-face side of the display panel 11, as shown in FIG. 5. The backlight source 17 is configured with the surface light source 26, the light-flux control device 25, and the transparent-diffusion control element 27 stacked in this order from the lower side to the upper side, as shown in FIG. 5.

Among those, the surface light source 26 is configured with at least an edge-light light source 120 and a light guide plate 104. Further, in the First Example, the light-flux control device 25 is configured with a louver 121, and the transparent-diffusion control element 27 is configured with a scattering-type liquid crystal layer 102.

Furthermore, the edge-light light source 120 is typically configured with a cool cathode tube or white light source such as LED. Further, the light guide plate 104 configures the surface light source 26 by reflecting and scattering the light emitted from the edge-light light source 120.

The louver 121 is configured with a light-shielding layer 122 and a transparent layer 123. The light-shielding layer 122 is formed to shield the light emitted from the surface light source 26, and the transparent layer 123 is formed to collimate and let through the light emitted from the surface light source 26, and then direct the light to make incident on the scattering-type liquid crystal layer 102.

The scattering-type liquid crystal layer 102 (transparent-diffusion control element 27) has a structure in which a liquid crystal phase and a polymer phase are interlaced with one another. When the refractive indexes of the liquid crystal phase and the polymer phase are not uniform, an opaque scattering state is produced. When a voltage applied to the scattering-type liquid crystal layer 102, the liquid crystal phase starts to operate. Thus, the refractive indexes of the liquid crystal phase and the polymer phase become uniform, thereby producing a transparent state. That is, the scattering-type liquid crystal layer 102 is in a transparent state when a voltage is applied, and it is in a scattering state when the voltage is not applied.

Accordingly, the transparent state or a non-transparent state (scattering state) of the scattering-type liquid crystal layer 102 are utilized by being materialized as the narrow view field mode and the wide view field mode for the transmission light as will be described below.

As it is clear from the contents thereof, the liquid crystal display device 1a of such structure is a device to which the basic structure disclosed in FIG. 1A is applied.

In the liquid crystal display device 1a described above, the front-face side light source 18 is configured with an LED array 130 where LED elements are arranged in a rectangular frame, and it is disposed to light the front face of the display panel 11. In this First Example, the LED array 130 is set in a state to be lit with constant luminance at all times. In the meantime, supplied power (voltage supply) to the scattering-type liquid crystal layer 102 is adjusted when switching the narrow view field mode and the wide view field mode. That is, when the mode is switched to the narrow view field mode, a voltage is supplied to the scattering-type liquid crystal layer to turn the scattering-type liquid crystal layer 102 into the transparent state. Thereby, the device is turned to the narrow view field mode shown in FIG. 2A. Further, when the mode is switched to the wide view field mode, supply of the voltage to the scattering-type liquid crystal layer is stopped to turn the scattering-type liquid crystal layer 102 into the scattering state. Thereby, the device is turned to the wide view field mode shown in FIG. 2B.

In the meantime, the emission luminance of the light from the edge-light light source 120 can be more intensified for the wide view field mode than for the narrow view field mode by changing the electric current to be supplied. Thereby, the viewable field angle range can be adjusted by adjusting the transmission light luminance 51 as shown in FIG. 2B. Further, the diffusive reflection light luminance 52 can be adjusted by adjusting the luminance of the LED array 130 at a designing stage or by turning off and on a proper number of LEDs among a plurality of the mounted LEDs.

Next, operations and the like of the First Example will be described.

With the liquid crystal display device 1a of the First Example, the LED array 130 is lit up at all times. At the same time, supplied power to the scattering-type liquid crystal layer 102 and the LED array 130 is adjusted at the time of switching to the narrow view filed and the wide view field. That is, under the narrow view field mode, a voltage is supplied to the scattering-type liquid crystal layer 102 (transparent-diffusion control element 27) to turn the scattering-type liquid crystal layer 102 to the transparent state. With this, the transmission light with high directivity passes through the display panel 11, so that it is possible to obtain a state with transmission light of sharp directivity as in FIG. 2A.

The light amount of the diffusive reflection light from the diffusive reflection film 20 in FIG. 2A and FIG. 2B can be adjusted by selecting and setting the luminance of the LED array 130. Further, as shown in FIG. 2A, the viewable angle range can be freely adjusted and set by the extent of the diffusive reflection light luminance 52 that is obtained by adjusting the luminance of the LED array 130. In this Example, however, it is so set that the light amount of the diffusive reflection light becomes consistent for both the narrow view field mode and the wide view field mode.

Further, supply of the voltage to the scattering-type liquid crystal layer 102 (transparent-diffusion control element 27) is stopped in the wide view field mode. With this, the scattering-type liquid crystal layer 102 turns to the scattering state. At the same time, the transparent light luminance is increased when the emission luminance of the light from the edge-light light source 120 is intensified. Thus, it is set to the state shown in FIG. 2B, so that the viewable range is set to the wide view field mode. Other structures and the operational effects are the same as those of the exemplary embodiment shown FIG. 1.

As described, it is also possible with the First Example to obtain the liquid crystal display device 1a that similarly functions and provides the same operational effects as those of the exemplary embodiment described above.

As an exemplary advantage according to the invention, the invention employs the structure which outputs and displays superimposed light of the transmission light from the back whose directivity can be selected from two or more kinds and the diffusive reflection light obtained by diffusively reflecting the light irradiated from the front face by the diffusive reflection part. Thus, in the narrow view field mode, the display can be visually recognized only in a range where the luminance of the transmission light exceeds the luminance of the diffusive reflection light, i.e., in a narrow angle range centering on the vertical direction of the display surface, by utilizing the luminance distribution of the diffusive reflection light. Thus, a narrower angle range than the luminance distribution range of the transmission light becomes the viewable range. Further, in the wide view field mode, the luminance of the diffusive reflection light does not exceed the luminance of the transmission light, so that the viewable range depends on the luminance distribution of the transmission light. Therefore, in addition to being able to switching the range of the view field angles for the narrow view field mode and the wide view field mode, it is also possible to obtain a high directivity without using a light-shielding unit that requires sufficient height (thickness) in the narrow view field mode, unlike the conventional case. This makes it possible to provide an excellent liquid crystal display device that can be formed thin at a low cost and an electronic appliance having the same, which cannot be achieved with the conventional techniques.

SECOND EXAMPLE

FIG. 6 shows Second Example.

Same reference numerals are applied to the same structural elements as those of the above-described First Example.

Referring to FIG. 6, the liquid crystal type display panel 11 as the main structural element in a liquid crystal display device 1b is configured to include a TFT substrate 124, a TFT 125, a liquid crystal layer 126, a color filter layer 127, a color filter substrate 128, and a diffusive reflection part 19. The diffusive reflection part 19 is configured with a diffusive reflection film 20 having a diffusive reflection matrix 22 disposed in matrix by facing the display panel 11. The diffusive reflection matrix 22 is provided by facing the display panel 11 in FIG. 6 so as to increase the durability. However, it may be provided on the top-face side (reflection light source side) of the diffusive reflection film 20.

The diffusive reflection matrix 22 is formed by diffusive reflection ink in the Second Example. Further, diffusive reflection black matrixes 127a, 127a are provided for each pixel in the color filter layer 127 as well so as to reflect and diffuse the reflection light properly. With this, the definition at each pixel can be maintained.

Regarding each of the structural elements of the display panel 11, the TFT 125, the liquid crystal layer 126, the color filter layer 127, and the like are stacked in order and mounted on the TFT substrate 124, as shown in FIG. 6.

The liquid crystal display device 1b has a backlight source 17 on the bottom-face side of the display panel 11, as shown in FIG. 6. The backlight source 17 is configured with a surface light source 26, a light-flux control device 25, and a transparent-diffusion control element 27 stacked in this order from the lower side to the upper side, as shown in FIG. 6. The same structures as those of the First Example shown in FIG. 5 are employed for each of the light-flux control device 25, the surface light source 26, and the transparent-diffusion control element 27. Among those, the surface light source 26 is configured with a light guide plate 104 and an edge-light light source 120.

Further, reference numeral 135 indicates an edge-light current supply for the edge-light light source 120, and reference numeral 135A indicates a luminance adjusting device. The luminance adjusting device 135A has a function of adjusting the luminance of the transmission light by controlling the flown electric current of the edge-light light source 135 by being energized by a control part 132.

Furthermore, reference numeral 134 indicates an LED array current supply for the LED array 130 that is the front-face side light source. Reference numeral 134A indicates a front-face side light source luminance adjusting device. The front-face side light source luminance adjusting device 134A has a function of adjusting the luminance of the diffusive reflection light (diffusive reflection light luminance) by controlling the flown electric current of the LED array current supply 134 by being energized by the control part 132.

As in the case of the First Example (FIG. 5) described above, the front-face side light source 18 of the liquid crystal display device 1b is also configured with an LED array 130 where LED elements are arranged in a rectangular frame, and it is disposed to light the front face of the display panel from an oblique direction, as shown in FIG. 6. The light from the LED array 130 (front-face side light source 18) is mainly reflected by the diffusive reflection matrix 22 part arranged in matrix on the diffusive reflection part 19, and it is measured as the diffusive refection light luminance 52 shown in FIG. 3A and FIG. 3B.

As it is clear from the contents thereof, the liquid crystal display device 1b of such structure is a device to which the basic structure disclosed in FIG. 1B is applied.

Next, operations and the like of the Second Example will be described.

The liquid crystal display device 1b of the Second Example includes the surface light source 26 that is formed in the same manner as that of the First Example described above by being configured with the edge-light light source 120 and the light guide plate 104. The edge-light light source 120 is lit by an electric current supplied from the edge-light current supply 135. Further, the LED array 130 receives supply of electric current from the LED array current supply 134. The scattering-type liquid crystal layer 102 (transparent-diffusion control element 27) receives supply of voltage from a scattering-type liquid crystal layer driving part 133 when it is in a transparent state. The control part 132 controls the edge-light current supply 135, the LED array current supply 134, and the scattering-type liquid crystal driving part 133, so that each of those changes the current or the voltage supplied to the respective targets.

When a user selects and sets the narrow view field mode from the outside, the control part 132 controls each of the edge-light current supply 135, the LED array current supply 134, and the scattering-type liquid crystal driving part 133 so as to first set the current value of the edge-light current supply 135 to a low current value for the narrow view filed mode. Then, the scattering-type liquid crystal driving part 133 supplies a voltage to the scattering-type liquid crystal layer 102 to turn the scattering-type liquid crystal layer 102 into a transparent state. Furthermore, the current value of the LED array current supply 134 is set to high output so as to set the lighting luminance of the LED array 130 to be high. With this, the liquid crystal display device 1b is switched to the narrow view field mode shown in FIG. 3A.

Meanwhile, when the user selects and sets the wide view field mode from the outside, the control part 132 controls each of the edge-light current supply 135, the LED array current supply 134, and the scattering-type liquid crystal driving part 133 so as to first set the current value of the edge-light current supply 135 to a high current value for the wide view filed mode. Then, supply of the voltage from the scattering-type liquid crystal driving part 133 to the scattering-type liquid crystal layer 102 is stopped to turn the scattering-type liquid crystal layer 102 into a scattering state. Furthermore, the current value of the LED array current supply 134 is set to low output so as to set the lighting luminance of the LED array 130 to be low. With this, the liquid crystal display device 1b is switched to the wide view field mode shown in FIG. 3B.

Other structures and the operational effects are the same as those of the First Example shown FIG. 5.

As described, it is also possible with the Second Example to obtain the liquid crystal display device 1b that similarly functions and provides the same operational effects as those of the First Example described above.

THIRD EXAMPLE

Figure 7:
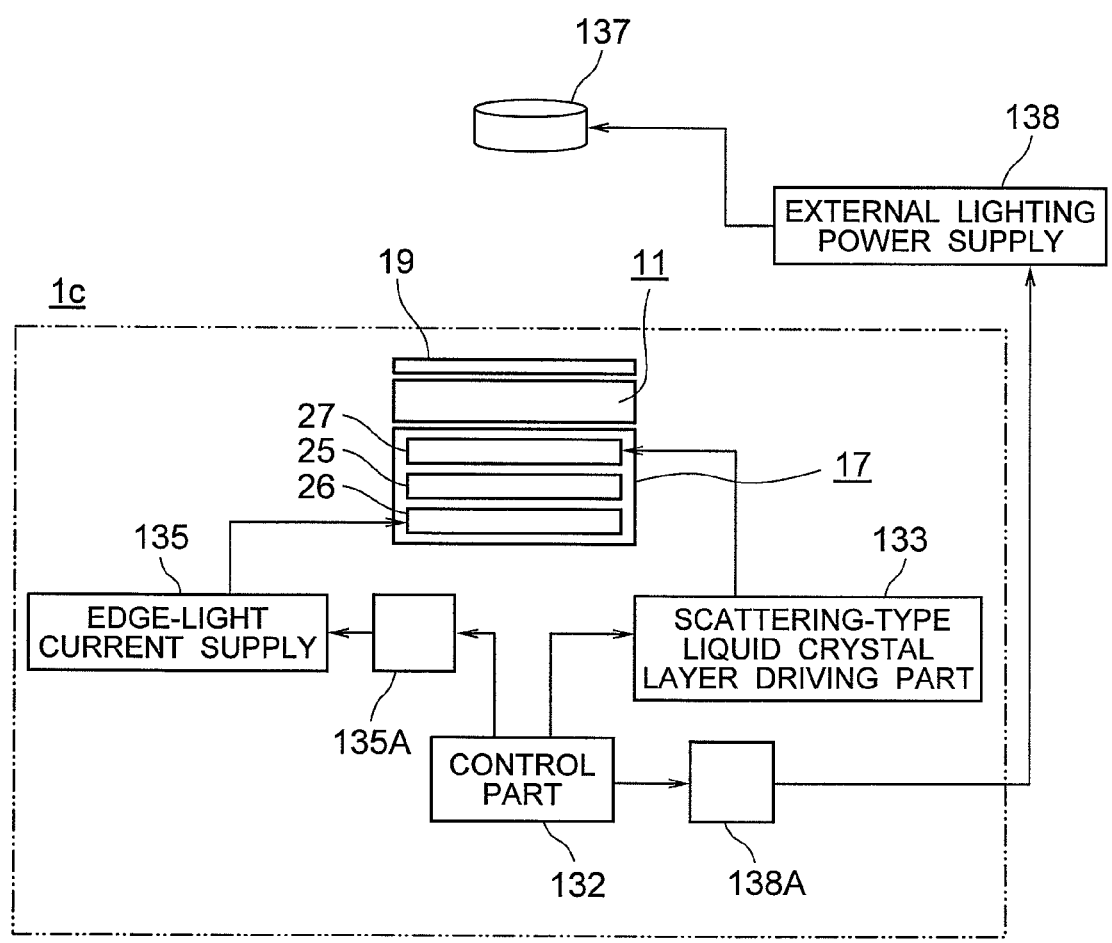
FIG. 7 is a block diagram showing Third Example of the present invention realized based on the exemplary embodiment of the liquid crystal display device disclosed in FIGS. 1A to 1C.

FIG. 7 shows Third Example. Same reference numerals are applied to the same structural elements as those of the above-described Second Example.

A difference between the Third Example and the Second Example is that the front-face side light source for irradiating light to the diffusive reflection part 19 is separately disposed from a casing that forms a liquid crystal display device 1c.

As shown in FIG. 7, for the liquid crystal display device 1c, the front-face side light source 18 disposed within the liquid crystal display device 1b of the Second Example is configured with an external lighting device 137 that is disposed outside the liquid crystal display device 1c. The luminance of the external lighting device 137 is set by controlling the flown current of an external lighting power supply 138 that is controlled by a front-face side light source luminance adjusting device 138A controlled by the control part 132 within the liquid crystal display device 1c. Further, the display contents on a whole surface of the display panel 11 are driven by the scattering-type liquid crystal layer driving part 133 as in the case of the Second Example. Other structures and the operational effects are the same as those of the Second Example described above.

As described above, in the Third Example, the diffusive reflection light and the transmission light are superimposed to be outputted for display, and the narrow view field mode and the wide view field mode are set freely by drive-controlling the display panel 11 and the backlight source 17 with the control part 132. Further, by making an adjustment to have an angle range where the luminance of the transmission light from the back side exceeds the luminance of the diffusive reflection light so as to adjust the luminance of the diffusive reflection light at the time of the narrow view field mode, for example, it is possible to achieve such an effect that the viewable angle range (directivity) of the transmission light can be set freely. Therefore, as in the cases of each of the above-described Examples, the Third Example has such an advantage that only the diffusive reflection light is outputted to those who are at oblique locations from the display panel 11, and the transmission light containing important information can be shielded.

PRACTICAL APPLICATION EXAMPLES

Figure 8A:
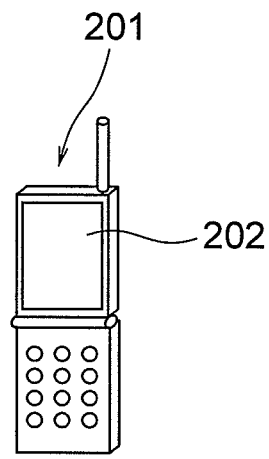
Figure 8B:
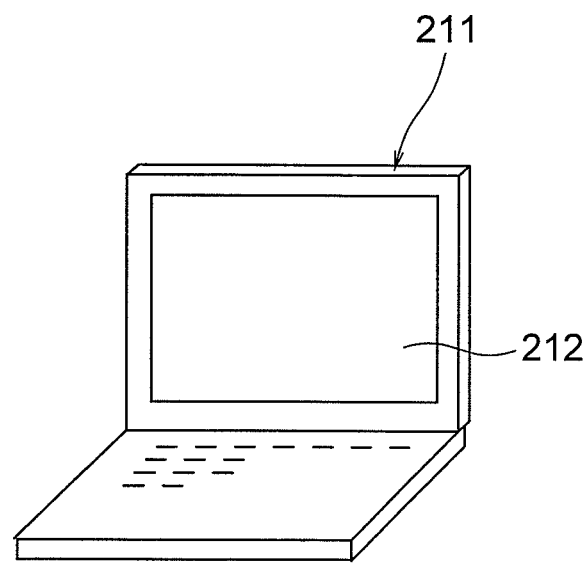

FIG. 8 shows illustrations for describing practical examples where the present invention is applied to a liquid crystal-type display device. For example, FIG. 8A shows a case where the present invention is applied to a display 202 of a portable telephone terminal 201, and FIG. 8B shows a case where the present invention is applied to a display 212 of a notebook-type PC 211. These are typical applications of the liquid crystal display device according to each of the First and Second Examples described above. Other than these cases, the present invention can also be applied to a game machine, a music player, an on-vehicle car navigation system, a DVD player, a clock, a television receiver set, and a digital camera, for example. Further, as practical application examples of the Third Example, the liquid crystal display device can be applied to general electronic appliances having industrial display unit, such as an automatic teller machine, a ticket-vending machine, and various information terminal devices.

The display device according to the present invention has been described by referring to the case of the liquid crystal panel having the display unit which requires a backlight source in particular. However, the present invention can also be applied to other self-luminous display devices which function in the same manner (there may be some types whose light source systems are partially different).

The present invention can be applied to the general electronic appliances which utilize the display devices of liquid crystal type and the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:
1. A display device, comprising:
a display panel;
a backlight source disposed on a back face of the display panel along the display panel;
a front-face side light source which is disposed in front of a front-face side of the display panel, and which irradiates light toward the front-face side of the display panel from an oblique direction; and
a diffusive reflection part, provided on the front-face side of the display panel between the front-face side light source and the front-face side of the display panel, which diffusively reflects light irradiated from the front-face side light source and transmits light from the backlight source transmitted through the display panel,
wherein the backlight source comprises a light-flux control device which collimates the light output from the backlight source, and a transparent-diffusion control element that includes liquid crystal that is electrically switchable between a transparent state in which the collimated light is transmitted without a change in directivity and a scattering state in which the collimated light is diffused, and
wherein the display device further comprises a control part which controls each of the backlight source, the front-face side light source, and the transparent-diffusion control element in association with each other to switch between a narrow view field mode and a wide view field mode.

2. The display device as claimed in claim 1, wherein the backlight source includes a luminance adjusting device which adjusts luminance of light transmitted by the backlight source based on control by the control part in accordance with an adjustment made to a directivity of the light transmitted by the backlight source.

3. The display device as claimed in claim 1, wherein the front-face side light source comprises a front-face side light source luminance adjusting device which adjusts luminance of the front-face side light source based on control by the control part in accordance with an adjustment made to the directivity of light transmitted by the backlight source.

4. The display device as claimed in claim 1, comprising a casing for housing the display panel and the backlight source, wherein
the front-face side light source is an external lighting device that is separately disposed from the casing.

5. The display device as claimed in claim 3, wherein:
the backlight source comprises a luminance adjusting device which adjusts luminance of light transmitted by the backlight source based on control by the control part in accordance with an adjustment made to a directivity of the light transmitted by the backlight source,
wherein the control part controls the luminance adjusting device of the backlight source such that a luminance of the light transmitted by the backlight source in the wide view field mode is greater than a luminance of the light transmitted by the backlight source in the narrow view field mode; and
control part controls a luminance of the front-face side light source to be constant in both the wide view field mode and the narrow view field mode.

6. The display device as claimed in claim 3, wherein the front-face side light source luminance adjusting device is controlled by the control part in accordance with a switching of the directivity of light transmitted by the backlight source such that a luminance of the front-face side light source in the wide view field mode is lower than a luminance of the front-face light source in the narrow view field mode.

7. The display device as claimed in claim 1, wherein the display panel is configured with a liquid crystal panel.

8. An electronic appliance comprising a display device, wherein the display device is the display device claimed in claim 1.

9. A display device, comprising:
- a display panel;
- a backlight source disposed on a back face of the display panel along the display panel;
- a front-face side light source which is disposed in front of a front-face side of the display panel, and which irradiates light towards the front-face side of the display panel from an oblique direction; and
- a diffusive reflection means, provided on the front-face side of the display panel between the front-face side light source and the front-face side of the display panel, which diffusively reflects light irradiated from the front-face side light source and transmits light from the backlight source,
- wherein the backlight source comprises a light-flux control device which collimates the light output from the backlight source, and a transparent-diffusion control element that includes liquid crystal that is electrically switchable between a transparent state in which the collimated light is transmitted without a change in directivity and a scattering state in which the collimated light is diffused, and
- wherein the display device further comprises a control part which controls each of the backlight source, the front-face side light source, and the transparent-diffusion control means in association with each other to switch between a narrow view field mode and a wide view field mode.

* * * * *